United States Patent [19]

Pedrini

[11] Patent Number: 5,117,805
[45] Date of Patent: Jun. 2, 1992

[54] LAMINATING MACHINE PARTICULARLY FOR THROUGH-SAWING SLABS MADE OF GRANITE AND THE LIKE

[76] Inventor: Luigi Pedrini, Via Fusine 3, 24060 Carobbio Degli Angeli (Provincia of di Bergamo), Italy

[21] Appl. No.: 645,993

[22] Filed: Jan. 23, 1991

[30] Foreign Application Priority Data

Feb. 2, 1990 [IT] Italy ................... 19250 A/90

[51] Int. Cl.$^5$ .............................................. B28D 1/04
[52] U.S. Cl. ................... 125/13.01; 125/23.01
[58] Field of Search ................... 125/13.01, 23.01; 83/864, 865; 144/193 R

[56] References Cited

U.S. PATENT DOCUMENTS

| | | | |
|---|---|---|---|
| 1,327,923 | 6/1920 | Phillips . | |
| 2,396,315 | 3/1946 | Bruker | 83/864 |
| 3,283,637 | 11/1966 | Brenner et al. | 83/432 |
| 3,641,853 | 2/1972 | Jungbeck | 83/864 |
| 3,933,064 | 1/1976 | Schoppee | 83/864 |
| 4,131,103 | 4/1977 | Ishizuka | 125/13.01 |
| 4,215,613 | 8/1980 | Anderson et al. | 83/864 |
| 4,364,423 | 12/1982 | Schilling | 144/193 R |

FOREIGN PATENT DOCUMENTS

| | | |
|---|---|---|
| 1942538 | 8/1969 | Fed. Rep. of Germany . |
| 3139428 | 10/1981 | Fed. Rep. of Germany . |
| 1570825 | 6/1969 | France . |

*Primary Examiner*—M. Rachuba
*Attorney, Agent, or Firm*—Guido Modiano; Albert Josif

[57] ABSTRACT

The laminating machine for through-sawing slabs of granite and the like, comprises a table which bears a supporting platform on which a conveyor belt for slabs of granite or the like is mounted. The table furthermore supports a train of diamond disks with progressively increasing diameters, each of which is individually motorized. The train of disks is arranged parallel to the supporting platform. The train of disks and the supporting platform are arranged on a plane which is inclined at an acute angle with respect to a horizontal plane.

8 Claims, 2 Drawing Sheets

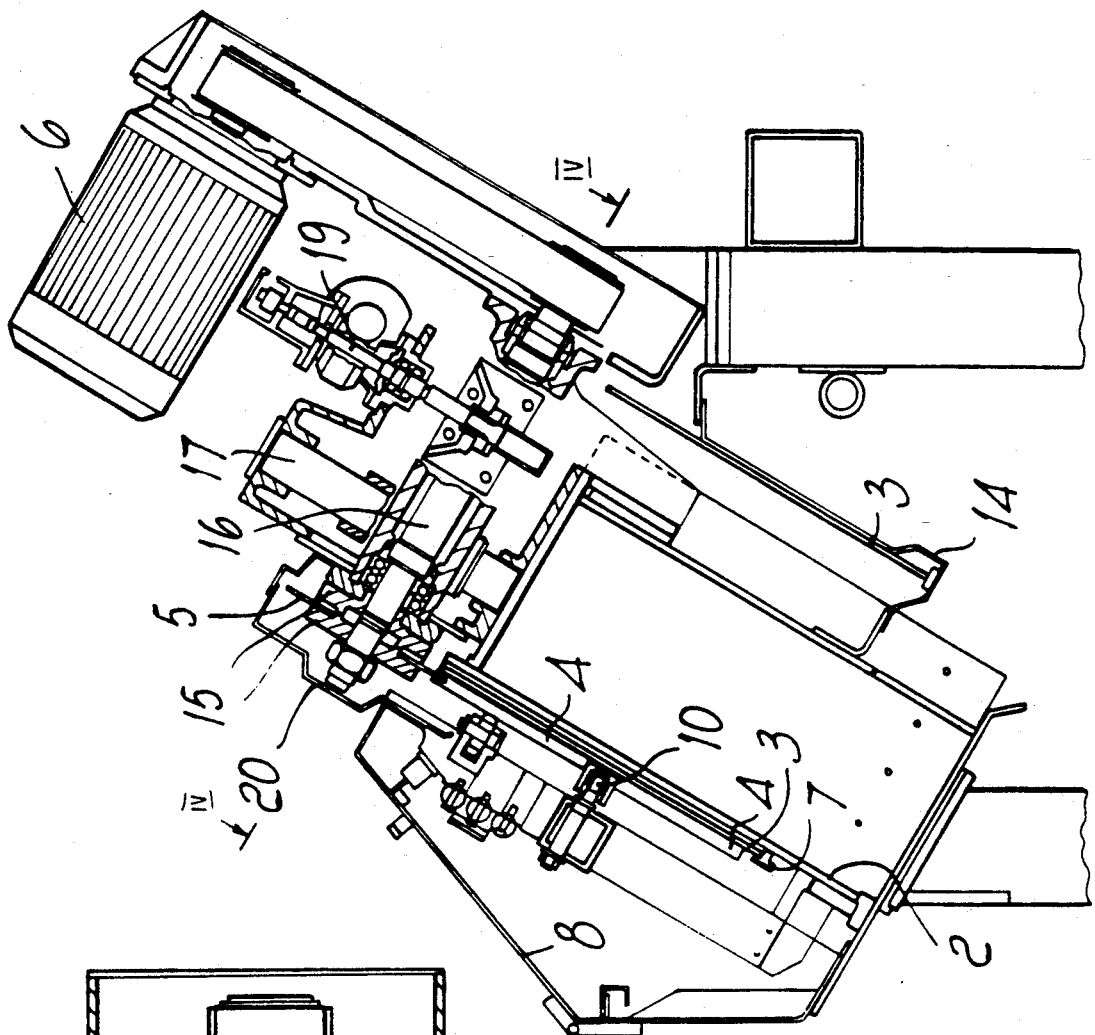
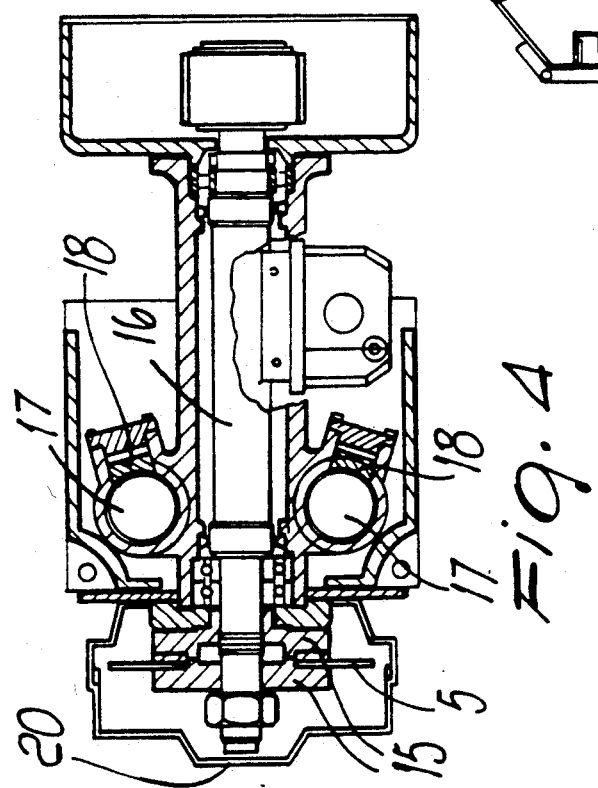

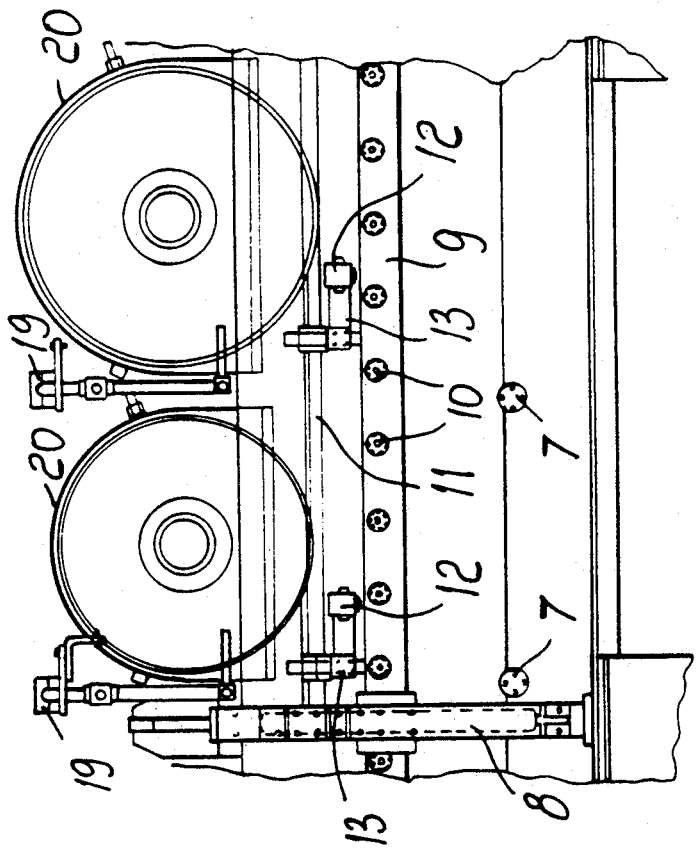
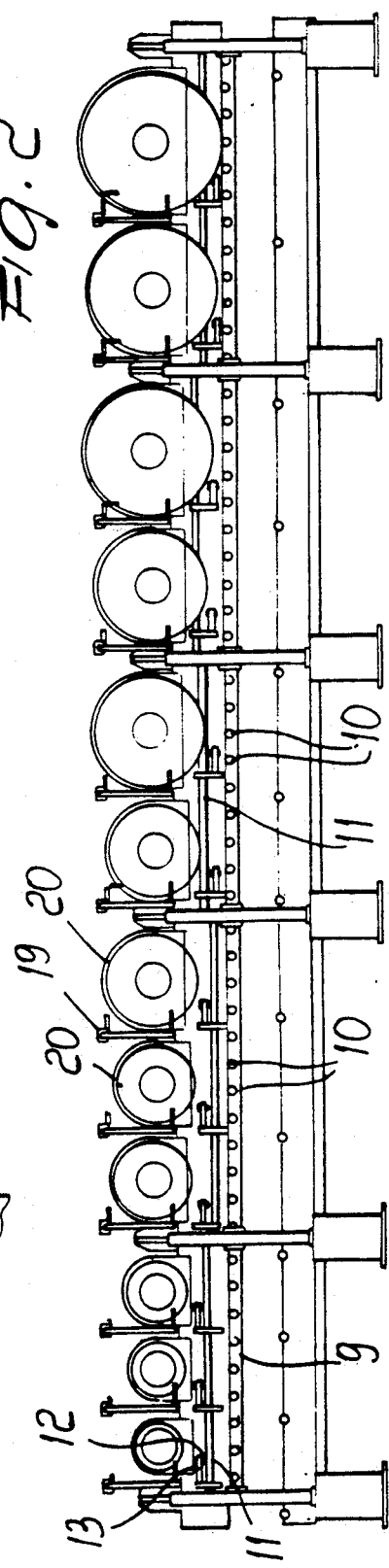

LAMINATING MACHINE PARTICULARLY FOR THROUGH-SAWING SLABS MADE OF GRANITE AND THE LIKE

BACKGROUND OF THE INVENTION

The present invention relates to a laminating machine particularly for through-sawing slabs made of granite and the like.

In the working method of slabs made of granite or of mining materials which have a hardness equal or very close to that of granite, a method for the production of either polished plates or of tiles obtained from slabs is performed which entails the polishing of both faces of the slab being processed and the subsequent through-sawing of the slab to obtain plates which are thinner than polished slab obtained without lamination.

The actual technical problem is related to the through-sawing of the slab into thinner plates. Splitting machines which have various solutions to the technical problem have in fact been used so far, but said machines can be traced back to two slabs working methods: horizontal working and vertical working.

In horizontal working, the plate is carried by a conveyor belt on a table, and through-sawing of the slab is performed by at least one train of diamond disks with progressively increasing diameters which are arranged parallel to the table. However, this method has numerous disadvantages. The most severe one is related to the cooling of the diamond disk during cutting, which is severely hindered by the horizontal position of the slab and of the disk, therefore entailing a very rapid wear of the diamond-bearing portion of the disk. Another disadvantage is constituted by the need to move the diamond disk so as to keep the cutting depth constant as a function of the wear of said disk. The above described problems cause this method to be used in practice only for relatively less hard materials, such as for example marble.

Vertical working entails the guiding of plates below a train of diamond disks with progressively increasing diameters so as to saw through the thickness of the slab. The problem is related to the guiding, which can cause the slab to oscillate so as to increase the wear of the diamond-bearing portion of the disk, furthermore causing an asymmetrical splitting of the slab, i.e. the lack of equal thickness in the two resulting plates.

SUMMARY OF THE INVENTION

The aim of the present invention is to eliminate or substantially reduce the disadvantages described above in known types by providing a laminating machine particularly for through-sawing slabs of granite and the like which reduces the wear of diamond disks and improves cooling with respect to horizontal working machines.

Within the scope of the above described aim, a particular object of the invention is to move the plates so as to keep them firmly guided, without producing vibration phenomena which lead to the wear of the disks.

Another object of the present invention is to provide a laminating machine which allows the through-cutting of a slab with resulting plates of uniform thickness.

Not least object of the present invention is to provide a laminating machine which is relatively easy to manufacture at competitive costs.

This aim, the objects mentioned and others which will become apparent hereinafter are achieved by a laminating machine particularly for through-sawing slabs of granite and the like, according to the invention, characterized in that it comprises a table which supports a supporting platform on which a conveyor belt for slabs of granite and the like is mounted, said supporting platform being arranged on a plane which is inclined at an acute angle with respect to a horizontal plane, said table supporting a train of diamond disks with progressively increasing diameters in the direction of advancement of the plates, each of said disks being arranged parallel to said supporting platform, substantially at the centerline plane of said plates.

BRIEF DESCRIPTION OF THE DRAWINGS

Further characteristics and advantages of the invention will become apparent from the description of a preferred but not exclusive embodiment of a laminating machine particularly for through-sawing slabs of granite and the like according to the invention, illustrated only by way of non-limitative example in the accompanying drawings, wherein:

FIG. 1 is a partially transverse sectional view of a laminating machine according to the invention;

FIG. 2 is a front elevation view of a laminating machine according to the invention;

FIG. 3 is a front elevation view of a detail of a laminating machine according to the invention; and FIG. 4 is a sectional view, taken along the line IV—IV of FIG. 1, of a detail of a retention brake for shafts which support diamond disks.

DESCRIPTION OF THE PREFERRED EMBODIMENTS

With reference to the above-cited figures, the laminating machine particularly for through-sawing slabs of granite and the like according to the invention, comprises a table 1 which supports a supporting platform 2 on which a conveyor belt 3 for slabs 4 made of granite or the like is mounted.

The table 1 furthermore supports a train of diamond disks 5 with progressively increasing diameters in the direction of advancement of the slabs, each disk being individually motorized by a motor 6. The train of disks 5 is arranged parallel to the supporting platform 2. The train of disks 5 and the supporting platform 2 are arranged on a plane which is inclined at an acute angle with respect to a horizontal plane.

This acute-angle inclination, with an angle with respect to the horizontal comprised between 30° and 70°, preferably between 45° and 60°, allows on one hand to maintain the advantages in cutting uniformity offered by the above described horizontal working and on the other hand to maintain an efficient cooling of the diamond disks 5 during the sawing of the slab 4 as occurs during vertical working of slabs.

Guiding rollers 7 for the conveyor belt are rotatably mounted on the supporting platform 2 so as to cause the conveyor belt 3 to advance correctly and most of all to prevent said belt 3 from moving downward.

In different positions according to the dimensions of the diamond disks 5, bridge-shaped elements 8 are arranged along the train of disks 5 and pass above the supporting platform 2 without making contact. Said bridge elements 8 are connected by cross-members 9 which support supporting rollers 10 which can be moved transversely with respect to the movement of the slab and can engage the lower edge of said slab so as to support it during working.

The bridge-shaped elements 8 are furthermore connected by supporting bars 11 for presser cylinders 12. By means of a first bracket 13, said presser cylinders 12 are mounted on said bars 11 in such a manner that the presser cylinder 12 is proximate to the cutting section, i.e. proximate to the point in which the disk 5 is in contact with the slab 4, so as to exert a slab-stabilizing action.

The conveyor belt 3 is supported, in the part of the machine which is not affected by the conveyance of slabs, by a second bracket 14 which is mounted in the rear part of the platform 2 and is connected to the table 1.

According to the invention, a train of disks, i.e. a series of disks with progressively increasing diameters, is provided on the machine so as to progressively saw the plate. Each of said disks 5 is mounted, by means of spacers 15, on a drive shaft 16 connected to the motor 6.

Said spacers 16 are necessary in order to perform through-sawing of slabs having different thicknesses, thus keeping the cut on the centerline of the thickness of the slab.

In order to compensate the wear of the diamond disks 5, the shafts 16 are mounted so as to be movable on smaller shafts 17 with which they are rigidly associated by hydraulic brakes 18. The position of the shaft can be controlled by means of an upright 19 by means of which the shaft 16 can be translated. The actuation of the translatory motion can be entrusted either to the experience of the operators of the machine or to electronic control means or to electromechanical control means. The electronic or electromecanical control means are adjusted according to the wear of the diamond-bearing portion of the disk 5 either by means of a wear function or by direct wear checking.

As an accident-prevention measure, the disks 5 are protected by housings 20 which, despite leaving the cutting section free, extend up to above the plate 4 so as to prevent any possibility of manual intervention on the disks or on the slabs during working.

Operation of the machine is as follows: a slab 4 is rested on the conveyor belt 3, guided by the rollers 7; the plate supported by the rollers 10 is compressed against the platform 2 by the cylinders 12. The slab 4 makes contact with the first one of the disks 5 and starts to be sawed. As it advances along the laminating machine, it undergoes the action of all of the disks 5 of the train until it is cut up to approximately half of its width, in case of considerable widths, or entirely for reduced widths. In order to complete the cutting, the slab 4 is subjected to a further pass in inverted position inside the laminating machine. The two passes are necessary both for correct cutting and to contain the size of both the laminating machine and the disks within moderate dimensions.

The invention thus conceived is susceptible to numerous modifications and variations, all of which are within the scope of the inventive concept. All the details may furthermore be replaced with other technically equivalent elements.

In practice, the materials employed, as well as the dimensions, may be any according to the requirements.

I claim:

1. Laminating machine particularly for through-sawing slabs of granite or the like, comprising a table which supports a supporting platform, said supporting platform having mounted thereon a conveyor belt for moving slabs made of granite or the like in a direction of advancement, said supporting platform being arranged on a plane which is inclined at an acute angle with respect to a horizontal plane, said table supporting a train of diamond disks, said discs having progressively increasing diameters in said direction of advancement of the slabs, each of said disks being arranged parallel to said supporting platform substantially at a centerline plane of said slabs.

2. Laminating machine, according to claim 1, wherein said supporting platform has means for supporting said conveyor belt.

3. Laminating machine, according to claim 1, wherein supporting bridges for means for pressing said slabs on said platform are mounted above said platform.

4. Laminating machine, according to claim 1, wherein supporting bridges bear supporting bars, said supporting bars having brackets, said brackets supporting cylinders for pressing the slabs on the supporting platform, said cylinders being arranged adjacent to said disks.

5. Laminating machine, according to claim 4, wherein said presser means are constituted by cross-members, said cross-members connecting said bridges, each cross-member supporting a plurality of rollers, each said plurality of rollers being adapted for supporting a slab on said platform.

6. Laminating machine, according to claim 1, wherein said diamond disks are rotated by motor means, and wherein said motor means are individually connected to said disks.

7. Laminating machine, according to claim 1, further comprising guiding means for the translatory motion of said disks to compensate their wear.

8. Laminating machine, according to claim 7, wherein said guiding means comprise shafts, and wherein said laminating machine further comprises brake means, said brake means acting on said shafts.

* * * * *